(12) United States Patent
Watson

(10) Patent No.: US 11,173,758 B2
(45) Date of Patent: Nov. 16, 2021

(54) HITCH RECEIVER ALIGNMENT SYSTEM

(71) Applicant: Dennis Watson, Angwin, CA (US)

(72) Inventor: Dennis Watson, Angwin, CA (US)

(*) Notice: Subject to any disclaimer, the term of this patent is extended or adjusted under 35 U.S.C. 154(b) by 0 days.

(21) Appl. No.: 16/941,900

(22) Filed: Jul. 29, 2020

(65) Prior Publication Data
US 2021/0053405 A1 Feb. 25, 2021

Related U.S. Application Data

(60) Provisional application No. 62/889,651, filed on Aug. 21, 2019.

(51) Int. Cl.
*B60D 1/24* (2006.01)
*B60D 1/40* (2006.01)

(52) U.S. Cl.
CPC ............. *B60D 1/241* (2013.01); *B60D 1/40* (2013.01)

(58) Field of Classification Search
CPC .................................. B60D 1/241; B60D 1/52
See application file for complete search history.

(56) References Cited

U.S. PATENT DOCUMENTS

| | | | |
|---|---|---|---|
| 5,593,172 A * | 1/1997 | Breslin | B60D 1/155 280/491.5 |
| 6,334,561 B1 * | 1/2002 | Cole | B60R 9/06 224/519 |
| 8,596,664 B2 * | 12/2013 | Lahn | B60D 1/52 280/506 |
| 9,616,722 B2 * | 4/2017 | Williams | B60D 1/52 |
| 10,046,612 B1 * | 8/2018 | Garcia | B60D 1/52 |

* cited by examiner

*Primary Examiner* — Kevin Hurley
(74) *Attorney, Agent, or Firm* — Johan Eide; Christopher Pilling; My Patent Guys

(57) ABSTRACT

The present invention relates to a hitch receiver alignment system having a first opening extending through and arranged upon a surface of the hitch receiver, a piston, a cylinder having a second opening adjoined to the hitch receiver, and a cylinder head having a third opening that is adapted to receive an alignment member that is manually adjusted by a user to contact the piston. As the user manually adjusts the alignment member, the piston consequentially is moved within a first opening extending through the hitch receiver. With the hitch being locked within the hitch receiver by a hitch pin, as the piston contacts the hitch within the hitch receiver the hitch is rotated about the hitch pin and a gap between the hitch and the hitch receiver is eliminated.

27 Claims, 18 Drawing Sheets

HITCH RECEIVER ALIGNMENT SYSTEM

CROSS-REFERENCE TO RELATED APPLICATIONS

The present invention claims priority to provisional application Ser. No. 62/889,651 entitled "HITCH RECEIVER ALIGNMENT SYSTEM" filed Aug. 21, 2019, the disclosure of which is hereby incorporated in its entirety at least by reference.

BACKGROUND

1. Field of the Invention

The present invention relates to a hitch receiver alignment system for removing the movement of a hitch within a hitch receiver of a vehicle during use.

2. Description of Related Art

Hitch receivers are commonly adjoined to vehicles such as tractors, trucks, cars and all-terrain vehicles. The hitch receiver typically comprising a universal square port configured to receive a hitch. The hitch inserted into the hitch receiver may commonly comprise a ball hitch, a kingpin hitch, a pintle hitch, and a weight-distributing hitch. The most common hitch typically being of the universal square port configuration. Furthermore, Class II and Class III hitch receivers are among the most common sizes mounted to vehicles. Class II hitches using a standard of a 1¼"×1¼" receiver tube, Class III hitches using a standard of a 2"×2" receiver tube or Class IV hitches using a standard of 2½"×2½" or 3"×3" receiver tubes. Various vehicle attachments such as bike racks, cargo platforms, signs and much more often commonly comprise a member having substantially the same cross-section shape as the receiver tube of the hitch receiver. Problems arise when the hitch or the member of a vehicle attachment are manufactured to different dimensional tolerances varying between different brands, manufacturing processes and tolerance grade standards internationally. This difference in manufacturing tolerance between the hitch and the receiver tube of the hitch receiver commonly results in a gap between the hitch and an internal wall of the hitch receiver tube, resulting in movement of the hitch during use. This movement can cause unnecessary damage, unpleasant noise, decreases fuel economy and impedes driver safety by limiting the driver's control of what is being towed.

Solutions have been proposed to remove the movement of the hitch within a hitch receiver tube or a hitch receiver by manual adjustment, wedges, shims, rubber members and other threaded devices. Exemplary prior art devices to be adjoined to a hitch receiver of a vehicle or a hitch itself include, U.S. patent Ser. No. 12/777,163, to Lahn, which addresses the problems listed above by manually adjusting a first wedge member enclosed within the hitch that is inserted within the receiver tube of the hitch receiver. The wedge therein eliminating the gap between the hitch and the internal wall of the receiver tube of the hitch receiver. Further exemplary prior includes U.S. patent Ser. No. 10/830,711, to Allsop et. al., which claims a mechanism for eliminating the undesirable play within a hitch receiver by means of a wedge member inserted between the hitch and the hitch receiver. The wedge member, the hitch receiver and the hitch all having a coupling structure that comprises a threaded opening. Issues arise when direct contact is made by a threaded member against a fixed surface. In this direct contract commonly, the threaded members are stripped when a user overtightens the threaded member against the fixed surface. Problems arise in hitch device embodiments, such as those claimed by Lahn and Allsop et. al., when the user commonly interchanges the hitch or interchanges various vehicle attachments to the vehicle. The devices listed above and similar devices also only eliminate the gap when a specific hitch is used, having the devices housed within, is inserted into the hitch receiver. The user has no way of eliminating the gap when another hitch or another attachment member is adjoined to the vehicle.

Secondly, many commonly available hitch devices for eliminating hitch rattling and the gap between the hitch and the hitch receiver tube require precise alignment, many moving parts and considerable assembly time by the user. Thirdly, many commercially available devices for addressing the problems listed above require maintenance and service, that in turn requires the complete disassembly of the hitch from the hitch receiver and further disassembly of the device itself. Both of these disassembly processes cause the user to waste unnecessary time disassembling and reassembling the device when maintenance or service is needed. A solution is needed for eliminating the gap between the hitch and the hitch receiver tube of the hitch receiver that is compact, universally adaptable to multiple hitches, universally adaptable to multiple vehicle attachments, serviceable by the user without disassembly and quick adjustment by the user.

SUMMARY

The present invention relates to a hitch receiver alignment system that solves the problems listed above by adjoining the hitch receiver alignment system to a hitch receiver of a vehicle. The hitch receiver alignment system is manually adjusted by the user through an alignment member. The alignment member contacting a piston member that in turn contacts the hitch housed within the hitch receiver of the vehicle. As the user manually adjusts the alignment member, the piston consequentially is moved within a first opening extending through the hitch receiver. With the hitch being locked within the hitch receiver by a hitch pin. As the piston contacts the hitch within the hitch receiver, the hitch itself is rotated about the hitch pin and a gap between the hitch and the hitch receiver is eliminated.

One object of the present invention is to allow for quick adjustment of the gap between the hitch and the hitch receiver by simply manually adjusting the alignment member that is adjoined to the hitch receiver. In doing so, the user always has access to the hitch receiver alignment system.

Another object of the present invention is to provide the user limited to no maintenance required when using the hitch receiver alignment system for an extending period of time. Secondly, the hitch receiver alignment system does not require any disassembly or re-assembly between uses. This saves the user time wasted time spent on assembly and allows for a consistent use and repeatable aide to the user even when using different hitches and vehicle attachments, such as a bike rack.

Another object of the present invention is to provide a sleek and low-profile design that does not impede the attachment of a trailer to the hitch or impede the attachment of the exemplary vehicle attachments listed above to the hitch.

In order to do so, a hitch receiver alignment system is provided having a first opening extending through and arranged upon a surface of the hitch receiver and a piston having a proximal end and a distal end. The hitch receiver alignment system is assembled by arranging the distal end of the piston within the first opening. The piston is free to move within the first opening. Next, a cylinder having a second opening is adjoined to the hitch receiver and the second opening is adapted to receive the proximal end of the piston. The piston is free to move within the second opening. A first plurality of holes is then arranged upon the cylinder front surface and each hole of the first plurality of holes is adapted to receive a fastener passing first through a cylinder head during assembly. The cylinder head further having a third opening that is adapted to receive an alignment member that is manually adjusted by a user to contact and move the piston. With the movement of the piston, the hitch is rotated about a hitch pin and the gap within the hitch receiver is eliminated.

BRIEF DESCRIPTION OF THE FIGURES

The detailed description of some embodiments of the invention is made below with reference to the accompanying figures, wherein like numerals represent corresponding parts of the figures.

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF CERTAIN EMBODIMENTS

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

Figure 1:
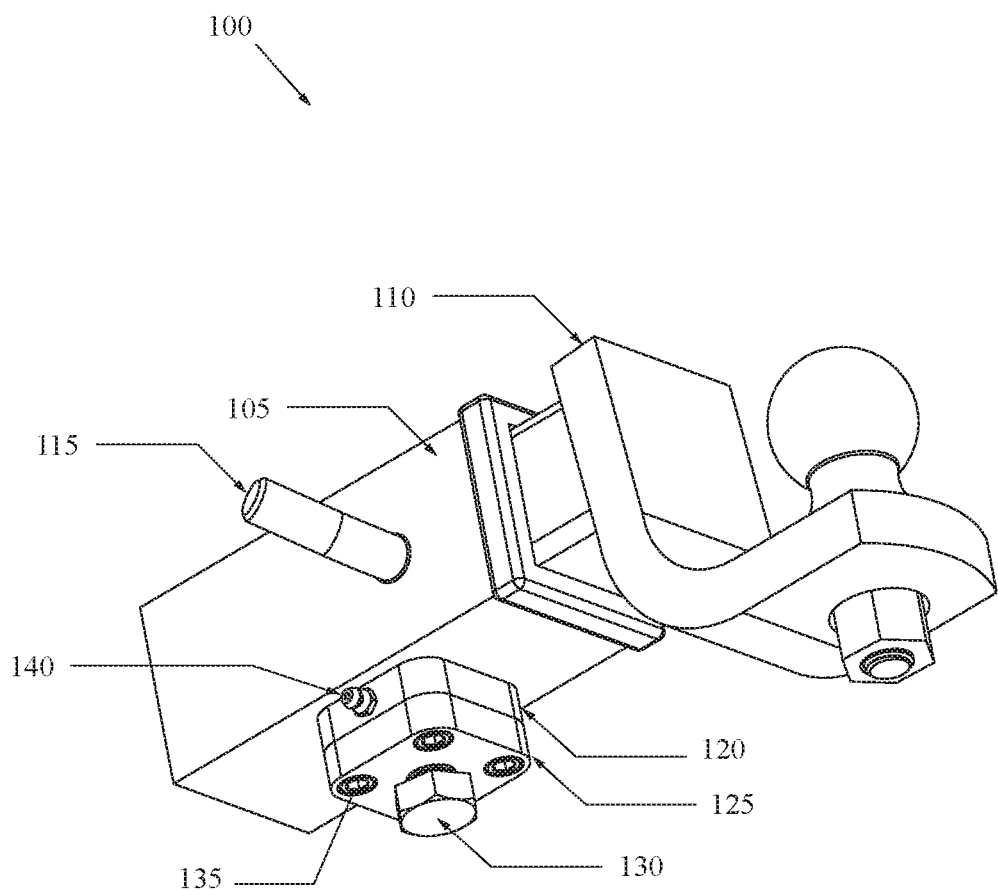
FIG. 1 shows an exemplary isometric view of one embodiment of the hitch receiver alignment system.
Figure 2:
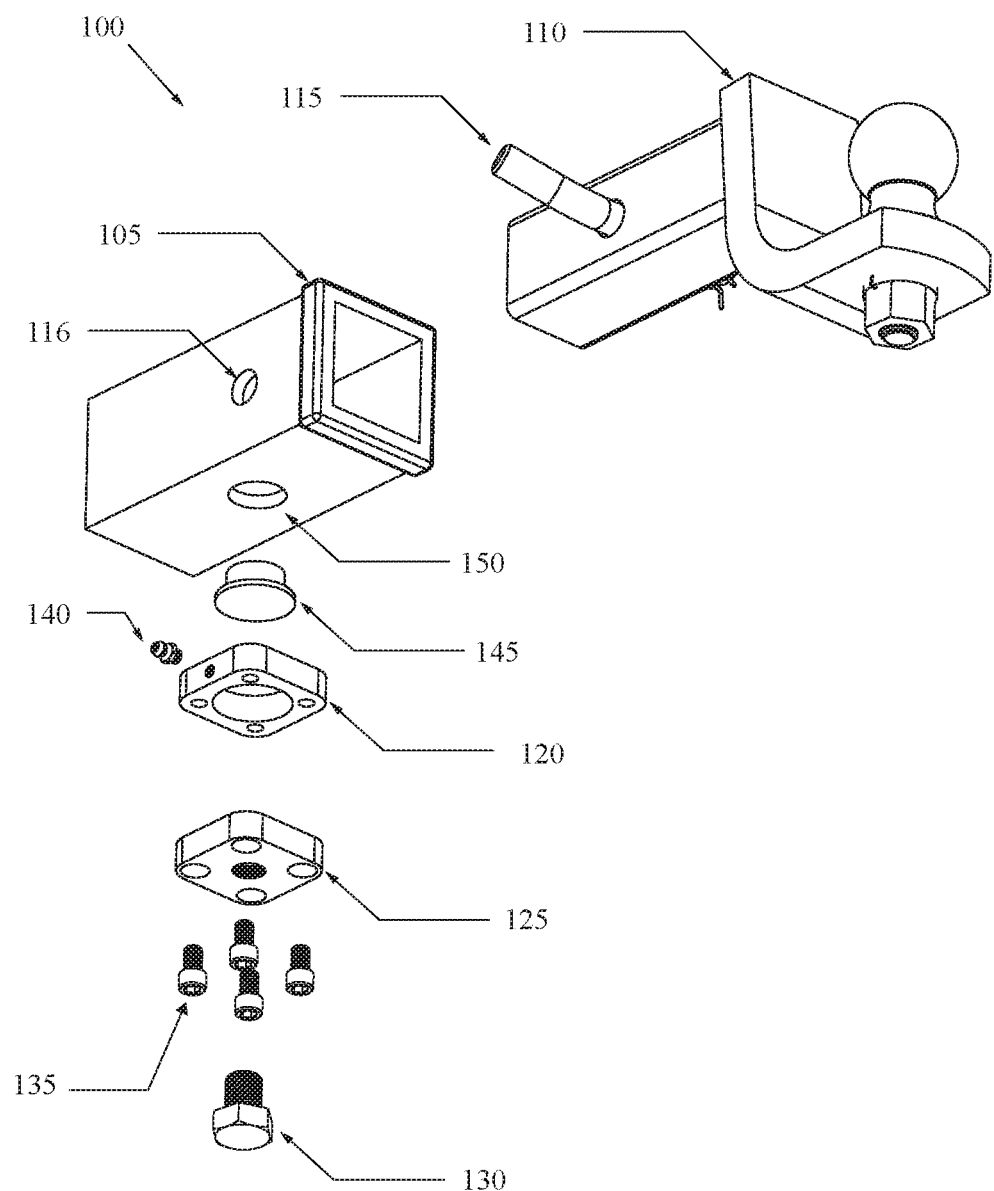
FIG. 2 shows an exemplary isometric view of one embodiment of the hitch receiver alignment system.

As shown in FIG. 1 and FIG. 2, a hitch receiver alignment system 100 is presented having a first opening 150 extending through and arranged upon a surface of a hitch receiver 105. The hitch receiver 105 adapted to receive a hitch 110. A cylinder 120 having a cylinder front surface, a second opening 180 and a cylinder rear surface is then adjoined to the hitch receiver 105. Next, a piston 145 having a proximal end and a distal end is arranged within the first opening 150 and the second opening 180 of the hitch receiver alignment system 100. In some embodiments, the diameter of the proximal end of the piston 145 is less than the diameter of the distal end of the piston 145. The second opening 180 of the cylinder 120 extends through the cylinder 120 and is adapted to receive the proximal end of the piston 145. The first opening 150 is adapted to receive the distal end of the piston 145. Next, during exemplary assembly a cylinder head 125 is adjoined to the cylinder front surface. The cylinder head 125 having a head front surface, a head rear surface, a second plurality of holes 160 and a third opening 155. The second plurality of holes 160, in the current exemplary embodiment, adapted to allow a fastener 135 pass through the second plurality of holes 160 to be received and threaded into a first plurality of holes 170 within the cylinder 120. In some embodiments, the rear surface of the cylinder head 125 further comprises a protrusion extension 165 adapted to fit within the second opening 180 of the cylinder 120. The protrusion extension 165 aiding in the alignment of the cylinder 120 and the cylinder head 125 during assembly and aiding in sealing the second opening 180.

Figure 3:
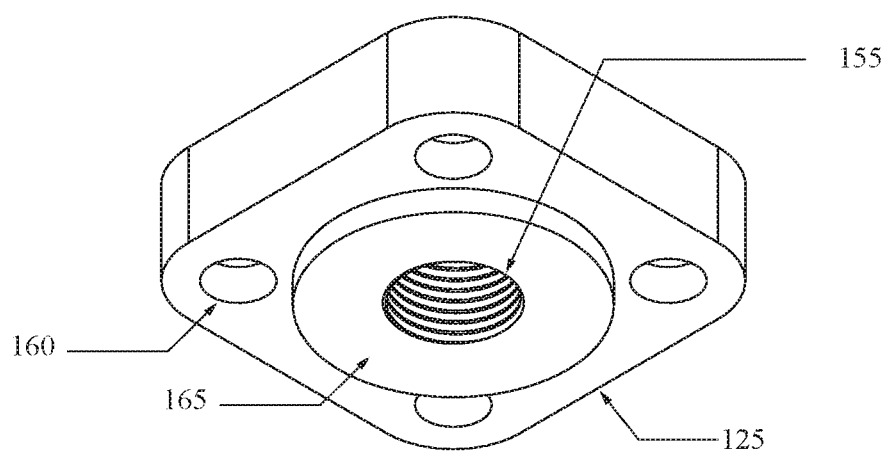
FIG. 3 shows an exemplary isometric view of one embodiment of the cylinder head of the hitch receiver alignment system.
Figure 4A:
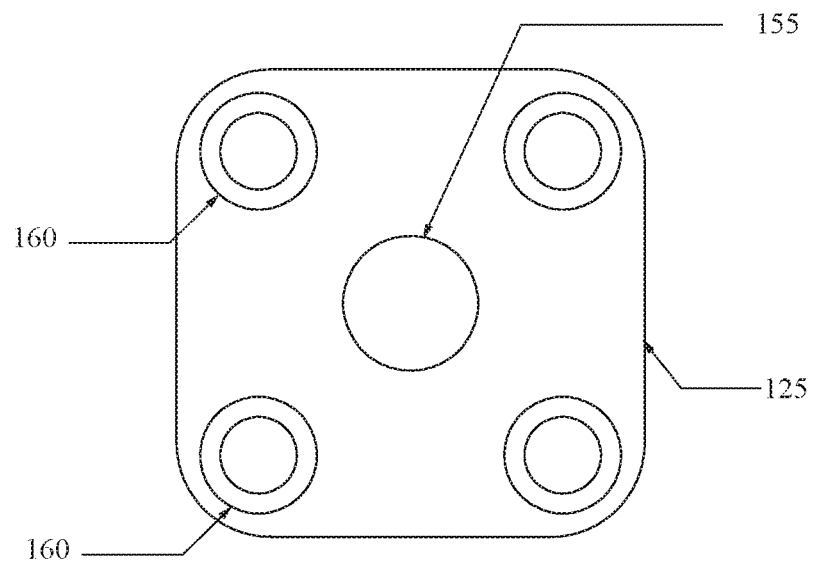
FIG. 4A shows an exemplary top view of one embodiment of the cylinder head of the hitch receiver alignment system.
Figure 4B:
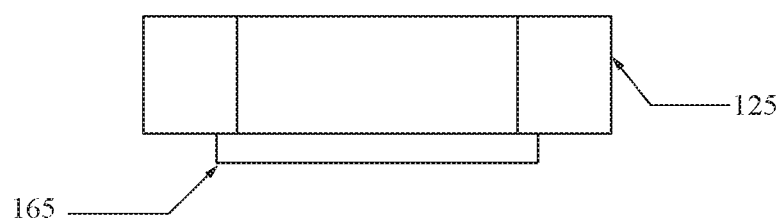
FIG. 4B shows an exemplary right view of one embodiment of the cylinder head of the hitch receiver alignment system.

As shown in FIGS. 3, 4A and 4B the third opening 155 extends through the cylinder head 125 and is adapted to receive an alignment member 130, wherein the alignment member 130 is manually adjusted by a user to contact the piston 145. In the exemplary embodiment shown in FIG. 3, the third opening 155 is tapped to receive the alignment member 130 embodied as a threaded bolt. In some embodiments, the second opening 180 is pressurized and the third opening 155 comprises a pneumatic fitting allowing for the entry of a compressed air into the second opening 180. In some embodiments, the alignment member 130 and/or the fastener 135 is at least one member of an alignment set, by way of non-limiting example, consisting of: a bolt, a pneumatic fitting, a spring, a lever, a latch, a lead screw, a set screw, a swivel-tip set screw, an extended tip set screw, a manually engaged dial, a knob, a socket attachment, a servo, a clamp, an actuator, a valve, a shock absorber or any combination thereof. The alignment set may further comprise any device known to one skilled in the art to facilitate controlled linear movement with or without manual engagement. In some embodiments, the cross-sectional shape of the distal end or the proximal end of the piston 145 is at least one shape of a shape set consisting of: an oval, a shape having at least one side, and a circle. In other embodiments, the second opening may by encapsulated and pressurized to aide in alignment of the hitch within the hitch receiver, An internal volume within the second opening between the proximal end of the piston and the cylinder. In other embodiments, the internal volume is formed within the second opening between the proximal end of the piston, the cylinder head and the cylinder. The pressurization of the second opening, internal volume or portions thereof may be pressurized by one member of a pressure material set consisting of: an oil, a gas, a fluid, and a volume of compressed air.

In some embodiments, the cylinder 120 further comprises a grease port 175 adapted to receive a grease fitting 140. The grease fitting 140 is configured to receive a grease gun for lubricating the piston 145, the alignment member 130, the first opening 150, lubricating within the third opening 155, and lubricating within the second opening 180. In some embodiments, the cylinder head 125 further comprises the grease port 175 adapted to receive the grease fitting 140. The grease fitting 140 is configured to receive a grease gun for lubricating the piston 145, the second opening 180, the first opening 150, the alignment member 130 and lubricating within the third opening 155. In some embodiments, a valve assembly 350 is included with hitch receiver alignment system 100 and includes at least one member of a valve set consisting of: a pressure control valve, a flow control valve, and a directional control valves, a directly operated valve, a pilot operated valve, a manually operated valve, an electrically actuated valve, an open control valve, a servo controlled valve, and a manifold. In yet another embodiment, the piston, pressure of the internal volume and/or the internal volume of the system 100 may further include an electronic control system 400 to be controlled wirelessly by a digital processing device 410 of the user and/or a vehicle.

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

Figure 5:
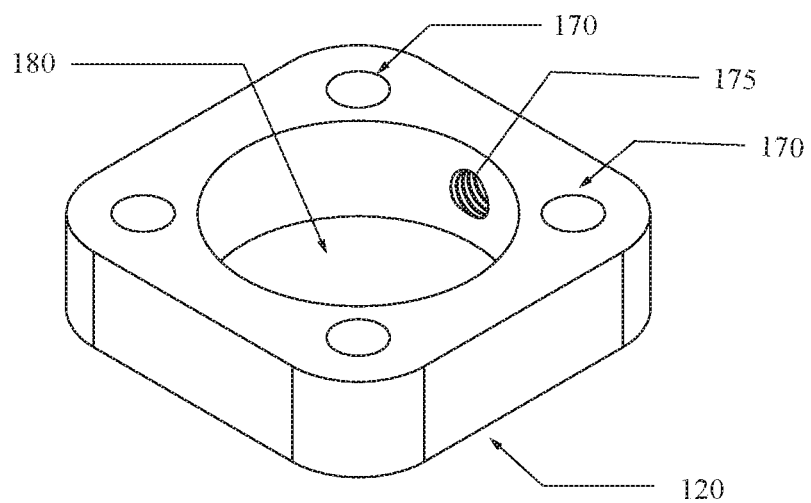
FIG. 5 shows an exemplary perspective view of one embodiment of the cylinder of the hitch receiver alignment system.
Figure 6A:
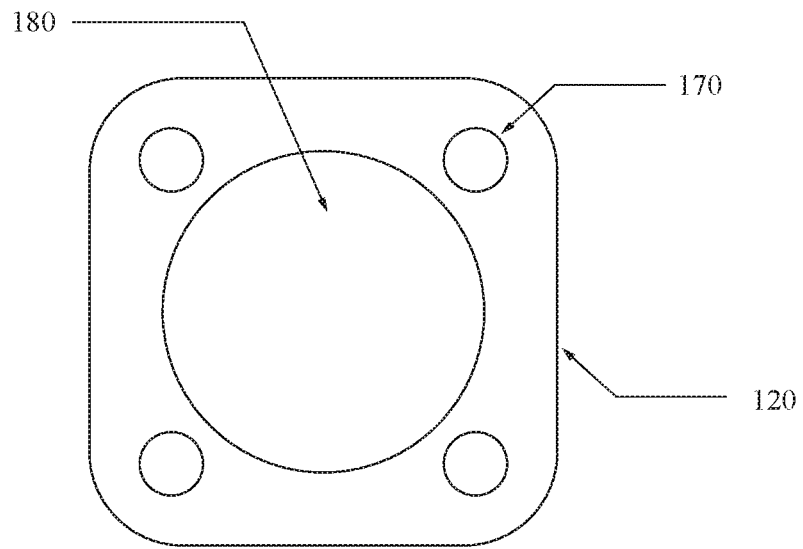
FIG. 6A shows an exemplary top view of one embodiment of the cylinder of the hitch receiver alignment system.
Figure 6B:
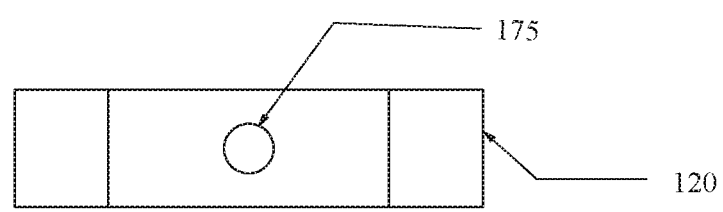
FIG. 6B shows an exemplary right view of one embodiment of the cylinder of the hitch receiver alignment system.

FIGS. 5, 6A and 6B illustrate the cylinder 120 of the hitch receiver alignment system 100. In some embodiments, the first plurality of holes 160 arranged upon the cylinder front surface, each hole of the first plurality of holes 160 adapted to receive the fastener 135. In some embodiments, the adjoining of the cylinder 120 to the cylinder head 125 is carried out by at least one member of an attachment set consisting of: a weld, at least one fastener 135, an adhesive, at least one threaded surface, a chemical bonding process, a press fit, a clamp, and a spring. In some embodiments, the adjoining of the cylinder 120 to the hitch receiver 105 is carried out by at least one member of the alignment set. In some embodiments, the adjoining of the grease fitting 140 to the cylinder 120 and/or the cylinder head 125 is carried out by at least one member of the alignment set. In some embodiments, the cylinder 120 and the cylinder head 125 are converted to one singular piece to comprise one component of the hitch receiver alignment system 100.

Figure 7:
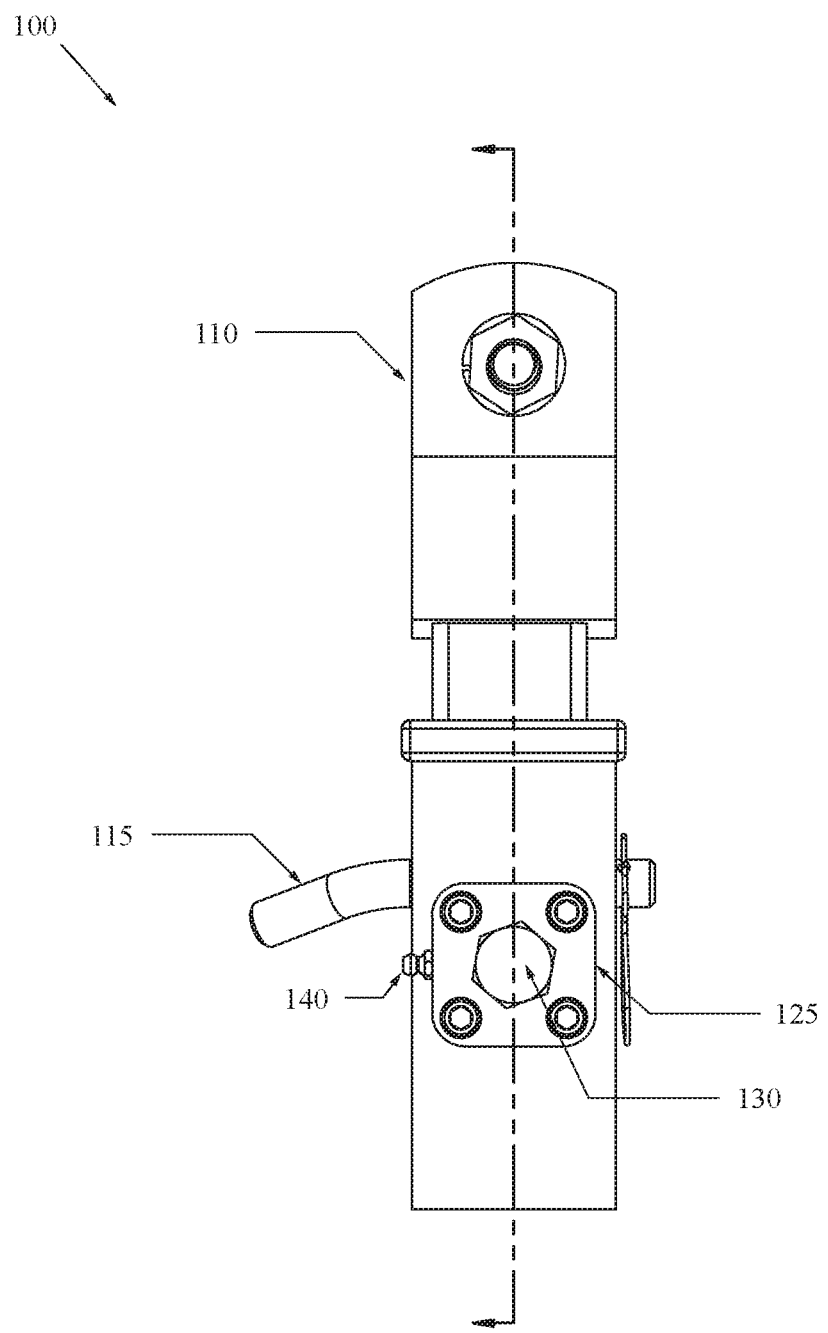
FIG. 7 shows an exemplary bottom view of one embodiment of the hitch receiver alignment system and the parting line 8-8 of the cross-sectional view shown in FIG. 8.
Figure 8:
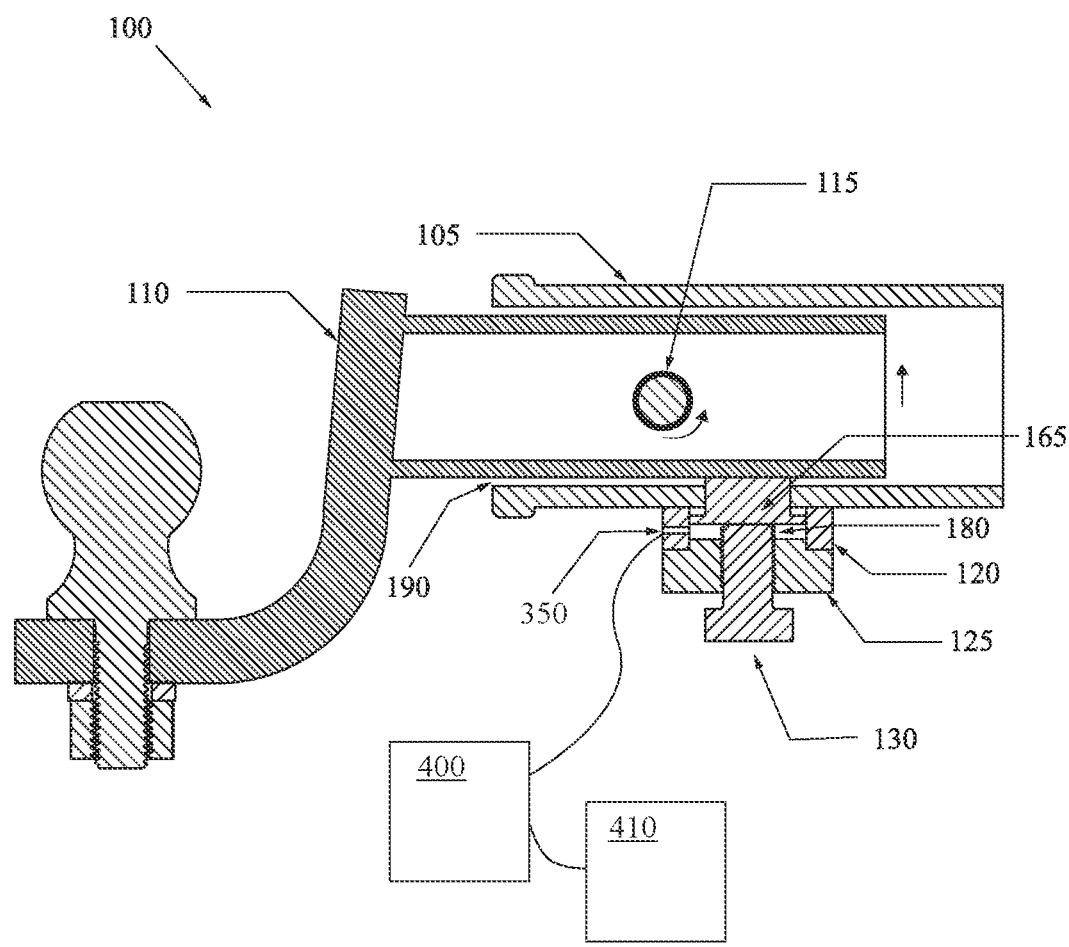
FIG. 8 shows an exemplary cross-sectional view of the hitch receiver alignment system taken along the parting line 8-8 in FIG. 7.
Figure 9:
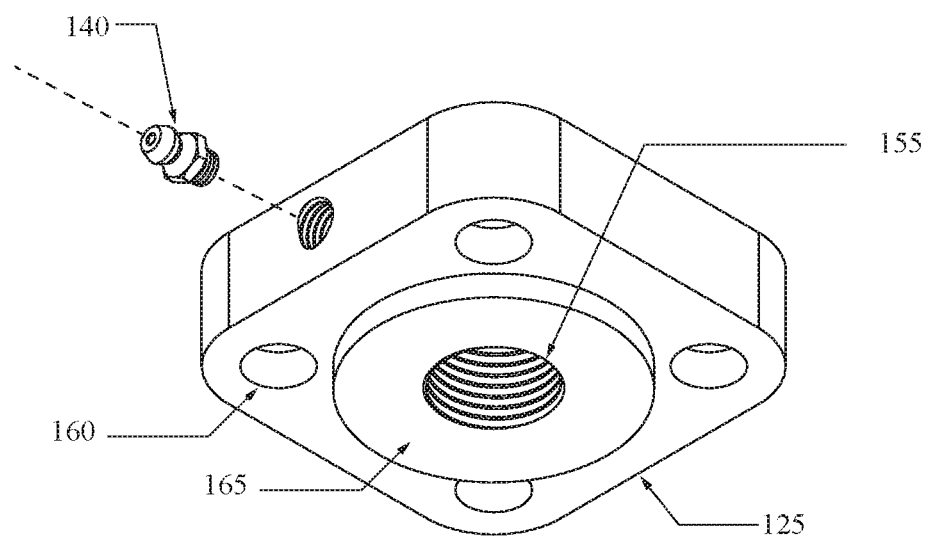
FIG. 9 shows an exemplary perspective view of one embodiment of the hitch receiver alignment system.
Figure 10:
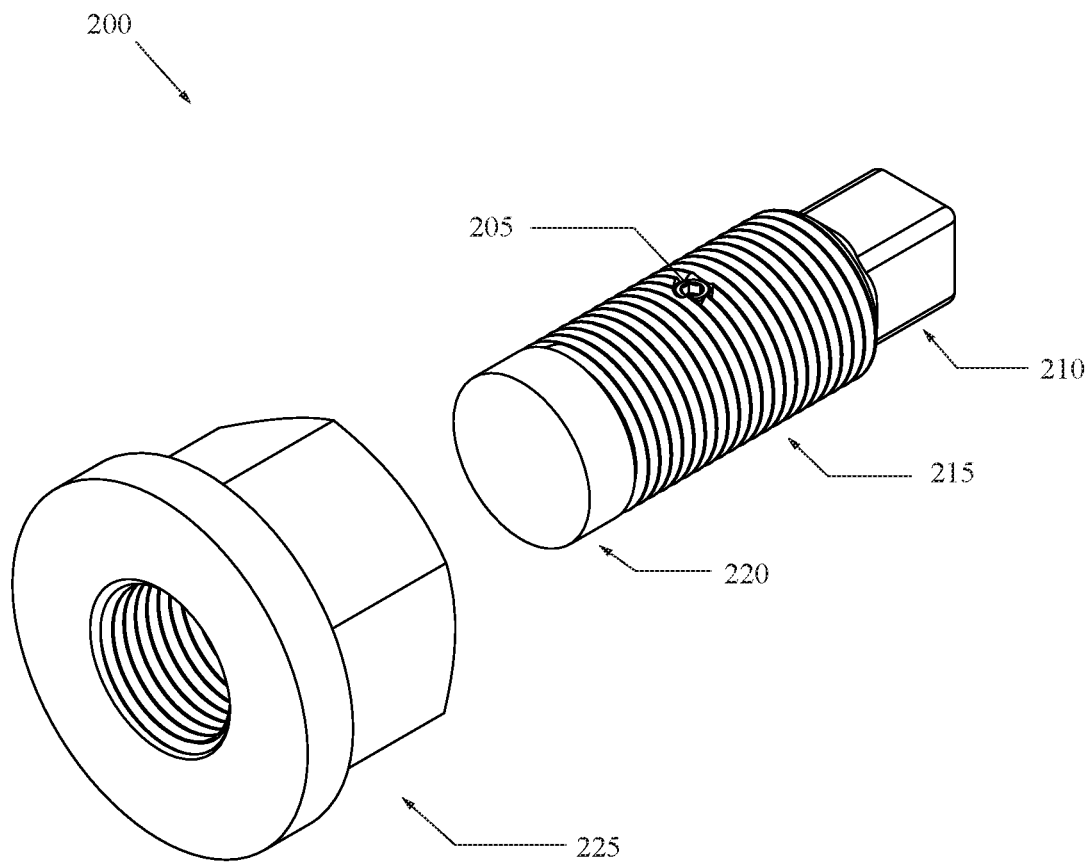
FIG. 10 shows an exemplary perspective view of one embodiment of the hitch receiver alignment system.
Figure 11:
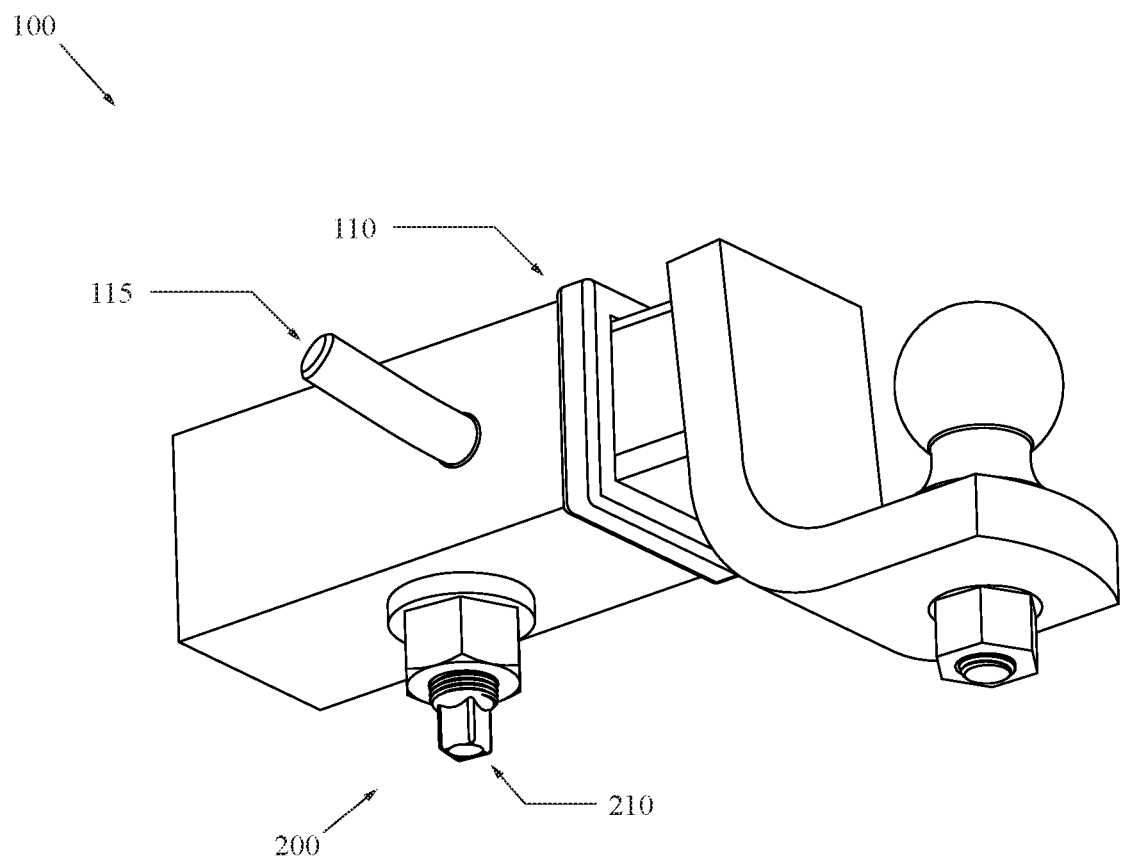
FIG. 11 shows an exemplary perspective view of one embodiment of the hitch receiver alignment system.
Figure 12:
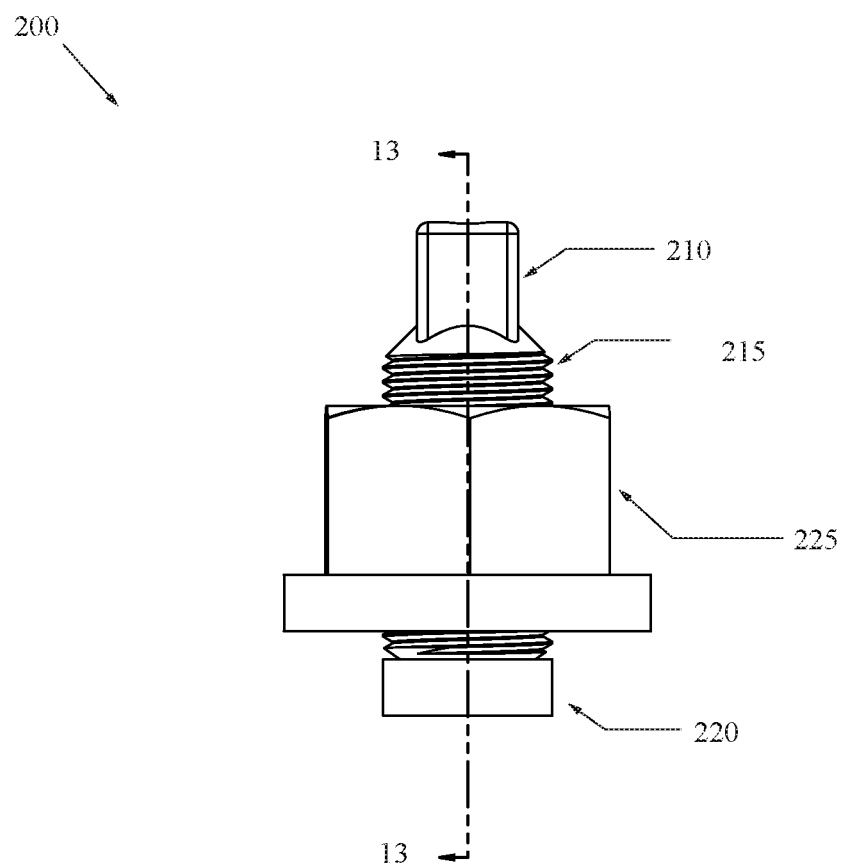
FIG. 12 shows an exemplary bottom view of one embodiment of the hitch receiver alignment system and the parting line 13-13 of the cross-sectional view shown in FIG. 13.

FIGS. 7 and 8 illustrate an exemplary cross-sectional view of the hitch receiver alignment system 100 taken along parting line 8-8 in FIG. 7. A hitch pin 115 is shown passing through a pin hole 116 and in doing so linearly secures the hitch within the hitch receiver 105. As the user adjusts the alignment member 130 of the hitch receiver alignment system 100, the alignment member 130 contacts the piston 145. The piston 145, in turn, contacts the hitch within the hitch receiver 105. In doing so, the hitch is rotated about the hitch pin 115 and/or the pin hole 116 and consequentially a gap 190 exists between the hitch and the hitch receiver 105 is closed. In some embodiments, when the hitch pin 115 is not substantially the same size as the pin hole 116, the hitch can be moved in a linear direction and not rotated about the hitch pin 115 and/or the pin hole 116.

In some embodiments, the hitch of the hitch receiver alignment system 100 is one member of a hitch set, by way of non-limiting example, consisting of: a ball hitch, a kingpin hitch, a pintle hitch, and a weight-distributing hitch. In some embodiments, the hitch receiver alignment system 100 is made of at least one material of a material set consisting of: a metal material, a composite material, a ceramic material, a cast iron material, a stainless steel material, a fiberglass material, a carbon fiber material, and a plastic material.

In some embodiments, the hitch receiver alignment system 100 further comprises at least one member of an identification set consisting of: an alphanumeric identification, a human user's name, a symbolic shape, a company brand, a numeric identification number, a QR code, a barcode, and an RFID tag. For example, the cylinder head 125 may display the socket size of the alignment member 130 to be tightening in securing the piston 145 against the hitch 110.

Figure 13:
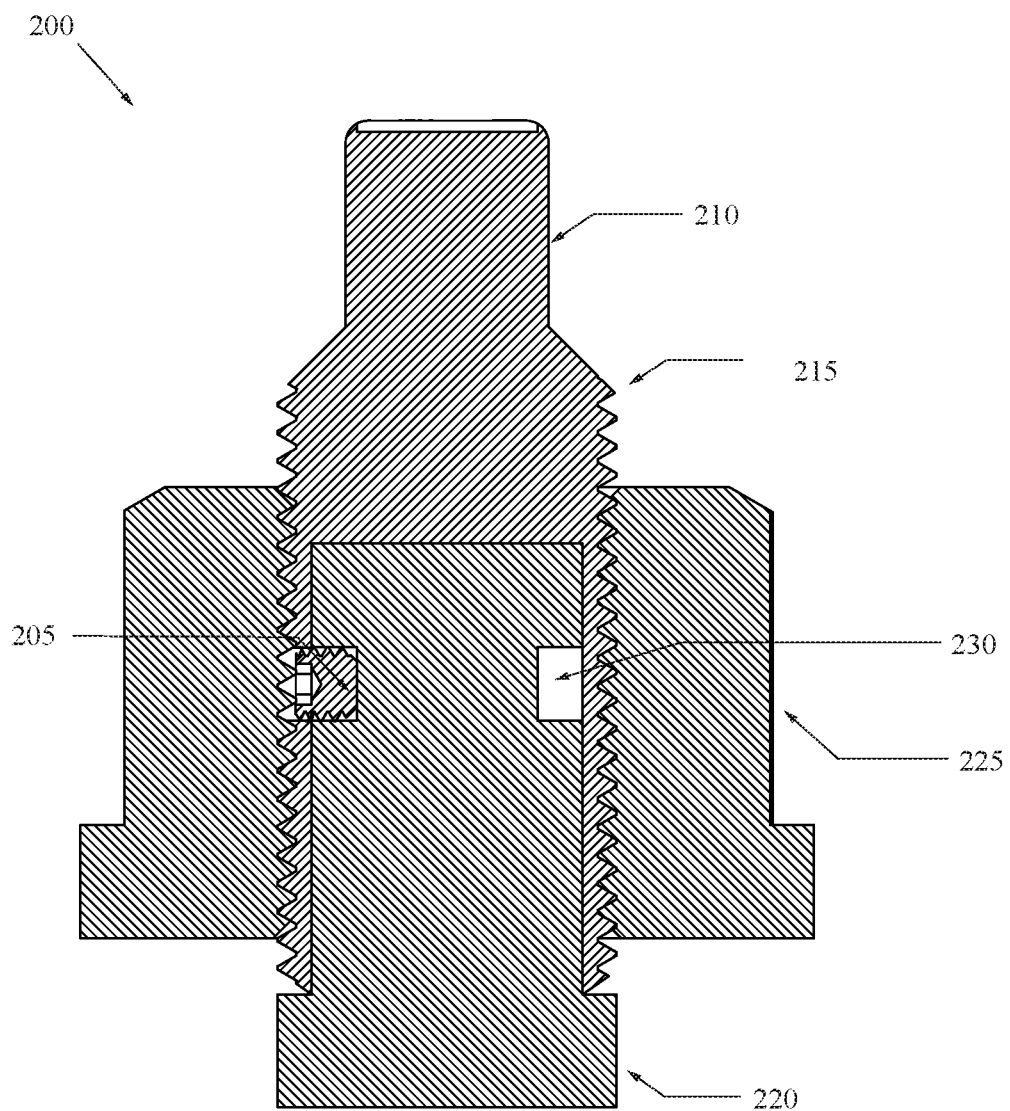
FIG. 13 shows an exemplary cross-sectional view of the hitch receiver alignment system taken along the parting line 13-13 in FIG. 12.
Figure 14:
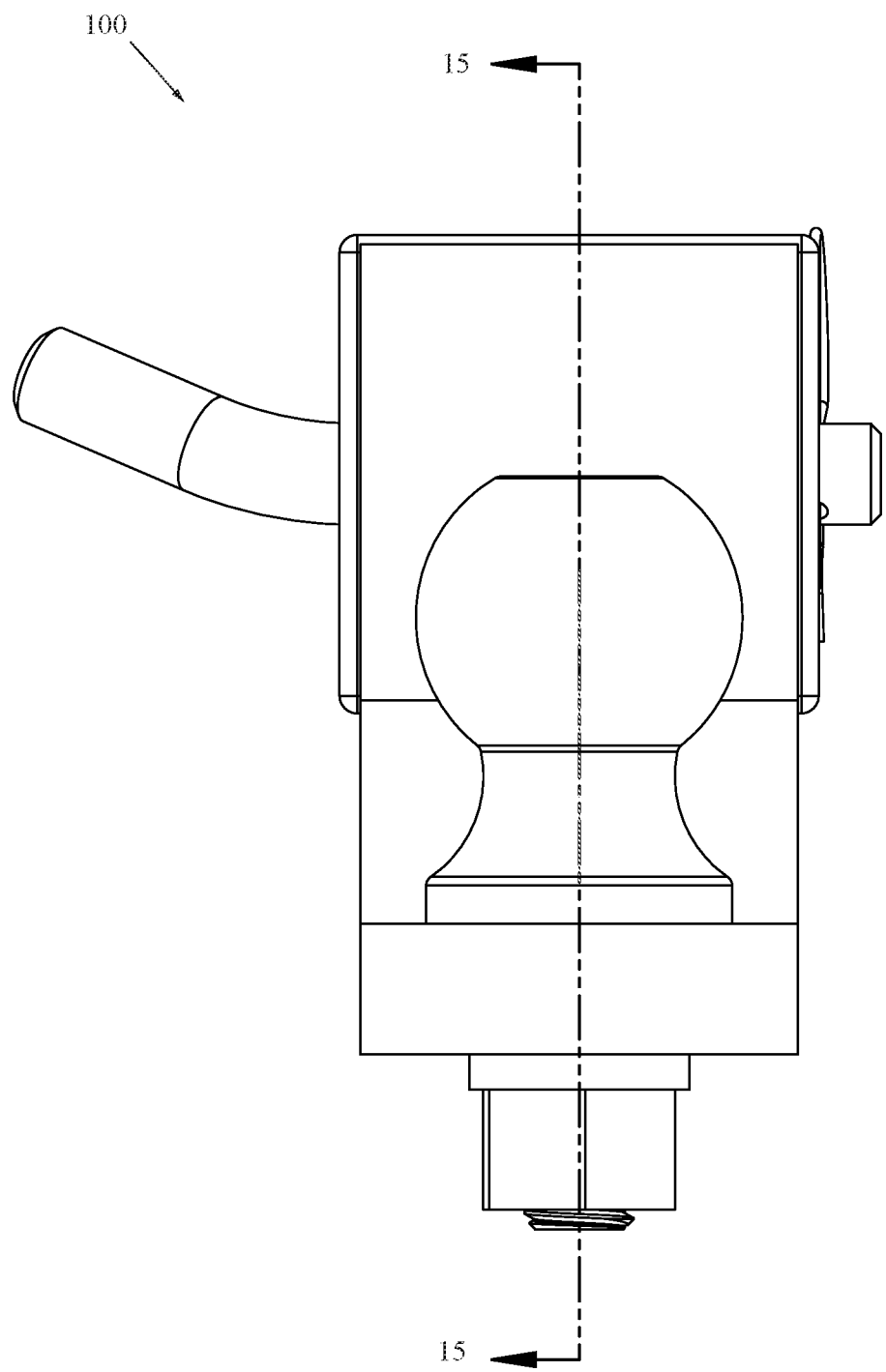
FIG. 14 shows an exemplary front view of one embodiment of the hitch receiver alignment system and the parting line 15-15 of the cross-sectional view shown in FIG. 15.
Figure 15:
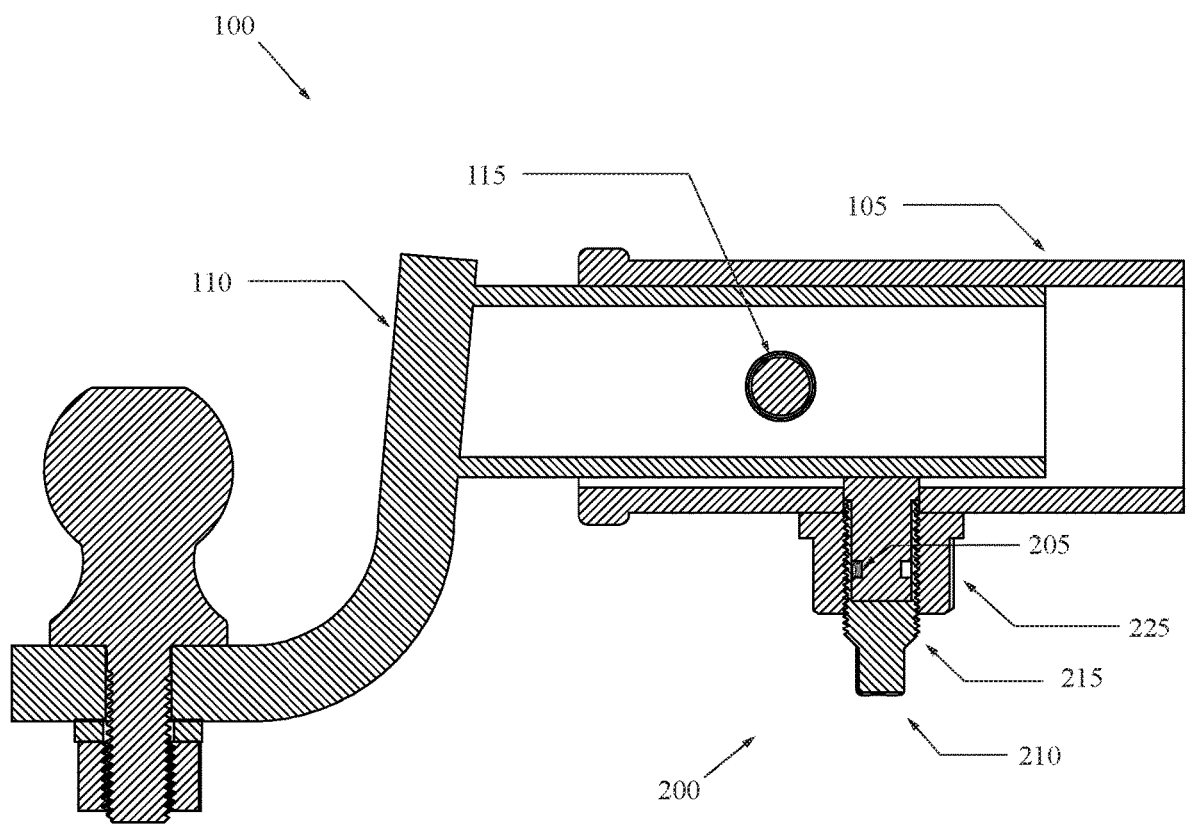
FIG. 15 shows an exemplary cross-sectional view of the hitch receiver alignment system taken along the parting line 15-15 in FIG. 14.
Figure 16:
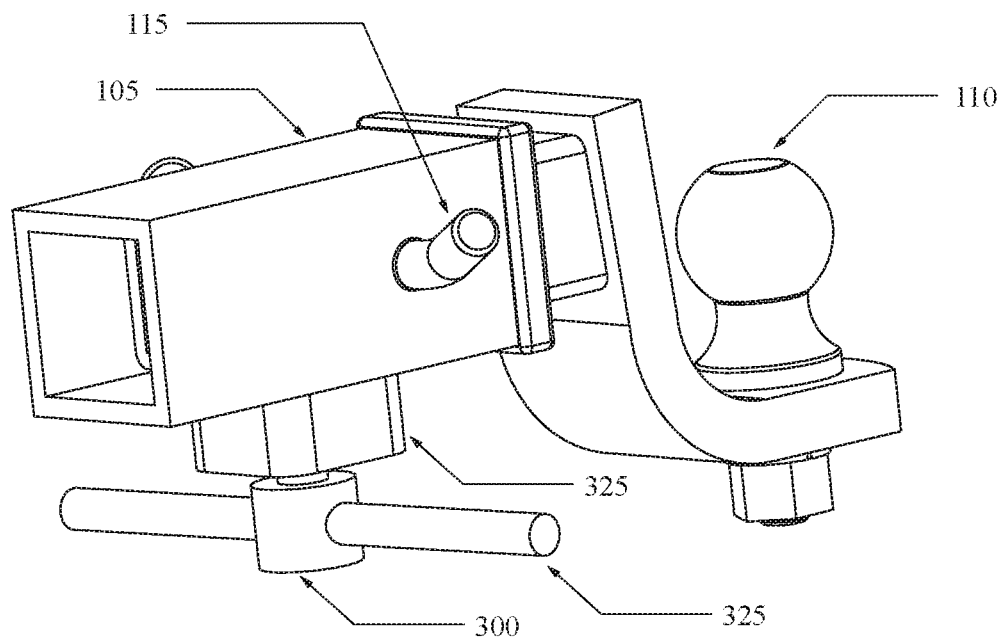
FIG. 16 shows an exemplary perspective view of one embodiment of the hitch receiver alignment system.
Figure 17:
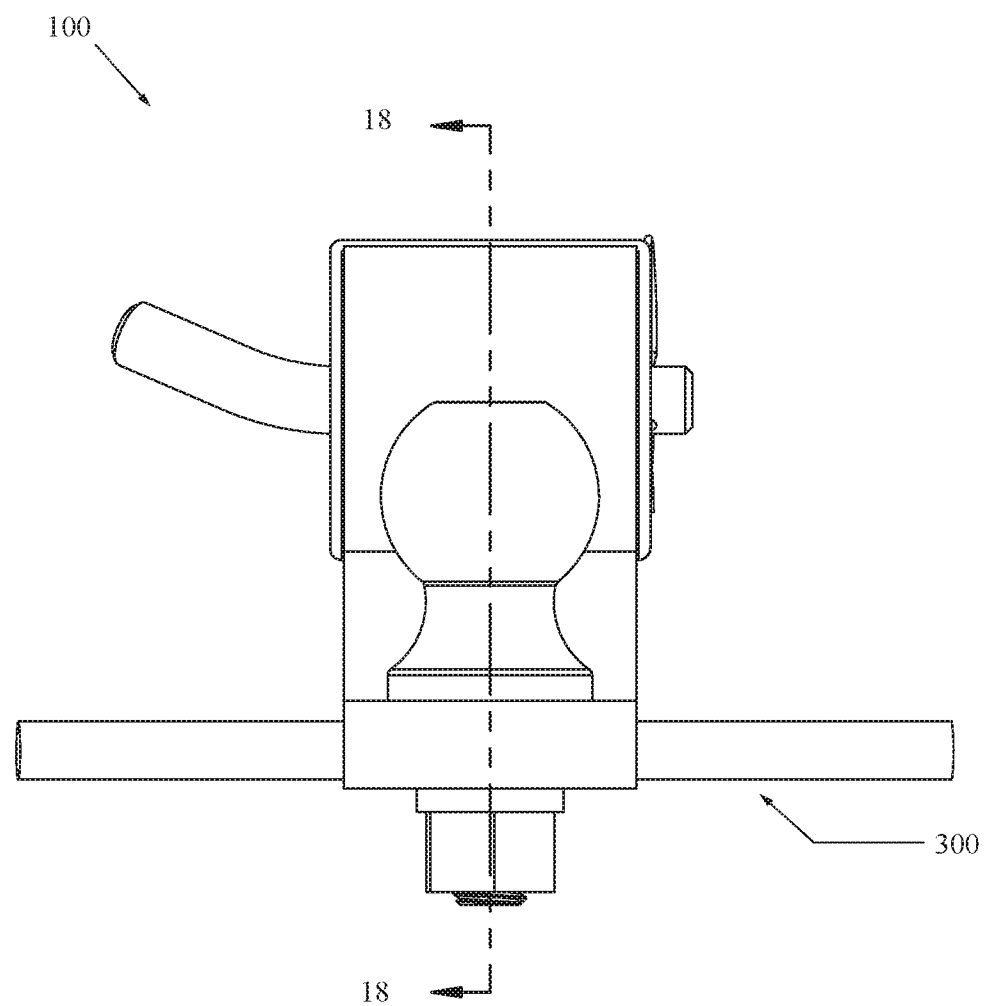
FIG. 17 shows an exemplary front view of one embodiment of the hitch receiver alignment system and the parting line 18-18 of the cross-sectional view shown in FIGS. 18A and 18B.

As shown in FIGS. 10-15 another embodiment of the hitch receiver alignment system 100 is shown as a nested piston assembly 200. The nested piston assembly 200 comprising a base member 225, a nested piston 220, a nested piston set screw 205 and a hollow bolt 215. In some embodiments, the hollow bolt 215 further comprises a second alignment member 210. The second alignment member 210 is at least one member of the alignment set, by way of non-limiting example, consisting of: a male socket protrusion, a female socket indentation, a lever, a latch, a tool receiving port, a manually engaged dial, a knob, a socket attachment, a servo, a clamp, an actuator, a valve or any combination thereof. One skilled in the art will recognize other possible embodiments of the second alignment member 210 for rotating the hollow bolt 215 as well known in the art. The nested piston assembly 200 is assembled by first inserting the nested piston 220 into a receiving port 230 of the hollow bolt 215 and consequentially securing the nested piston 220 in place with the nested piston set screw 205. Without limitation, one skilled in the art will recognize other fastening means that can be used to secure the nested piston 205 within the hollow bolt 215. It is critical to the present invention that during tightening of the nested piston set screw 205, that the nested piston set screw 205 does not protrude above the outside diameter of the hollow bolt 215, as shown in FIG. 13.

During operation, the nested piston 220 may be in a fixed position or free to translate and/or rotate within the hollow bolt 215. The user manually or automatically engages the second alignment member 210 to cause rotation of the hollow bolt 215. The rotation of the hollow bolt 215 is translated into linear movement of the hollow bolt 215, consequentially causing the nested piston 220 to contact and move the hitch 110 within the hitch receiver 105.

In yet another embodiment, the hitch receiver alignment system 100 further comprises a tool holder (not shown) mounted to the hitch receiver 105. A tool is designed to be held within the tool holder and the tool is designed to interface with the alignment member 130. For example, a socket wrench or an allen wrench may be temporarily held within the tool holder against the hitch receiver 105 until it is desired by the user to tighten the alignment member 130. In some embodiments, the hitch receiver alignment system 100 is designed to be used with at least one reduction sleeve 330 within the hitch receiver 105. One skilled in the art will recognize, without limitation, the type and size of reduction sleeves 330 to be used when adjoining hitches of different sizes, such as a 3" to 2½" reduction sleeve. In some embodiments, the first opening 150 extends through the hitch receiver 105 and/or a fourth opening 335 the at least one reduction sleeve 330.

Figure 18A:
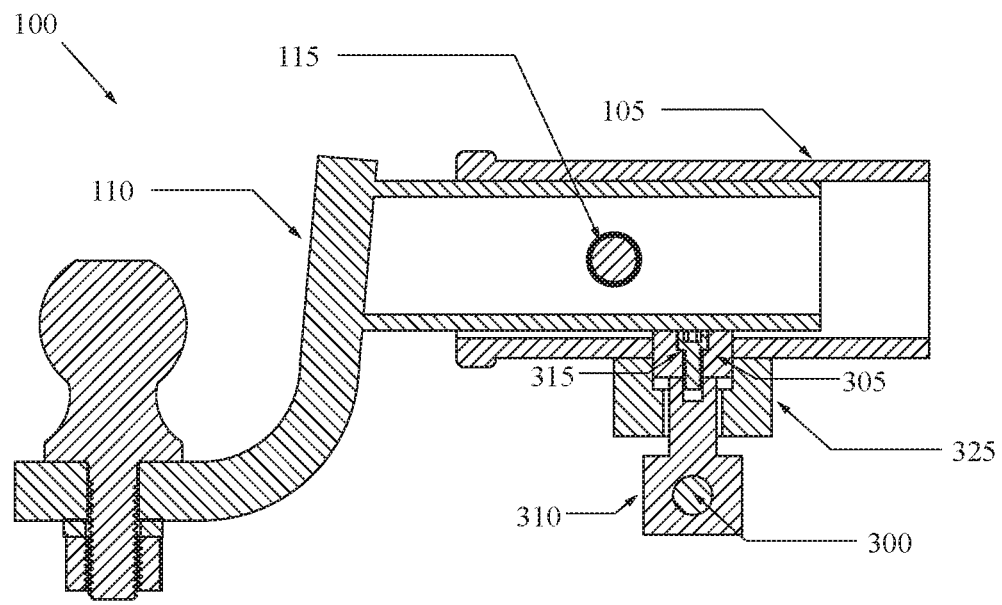
FIG. 18A shows an exemplary cross-sectional view of the hitch receiver alignment system taken along the parting line 18-18 in FIG. 17.
Figure 18B:
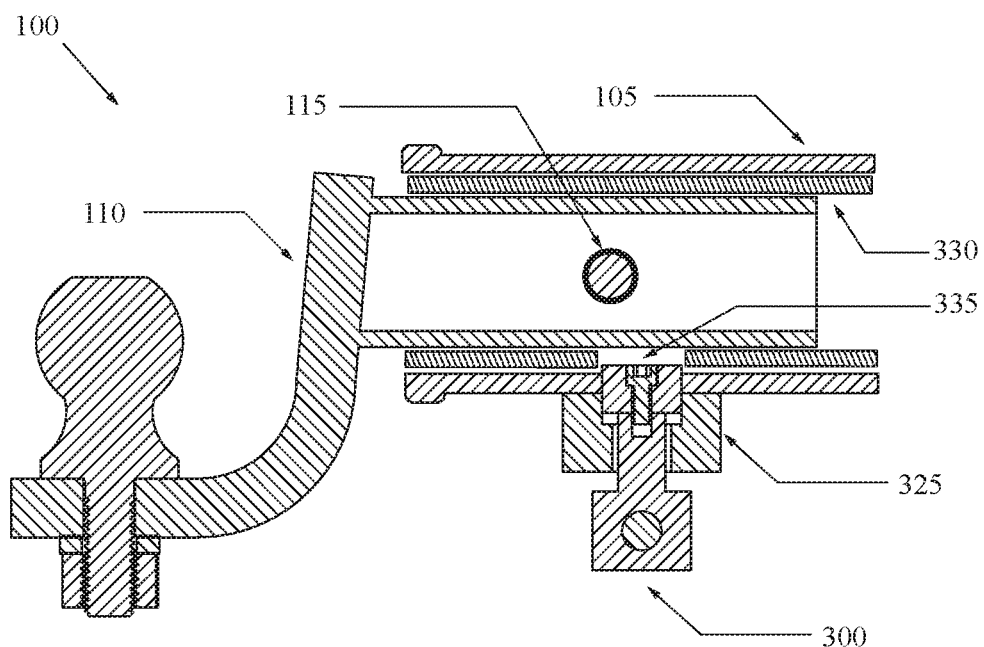
FIG. 18B shows an exemplary cross-sectional view of the hitch receiver alignment system taken along the parting line 18-18 in FIG. 17.

As shown in FIGS. 16, 17, 18A and 18B, another embodiment of the hitch receiver alignment system 100 is shown wherein the hitch receiver alignment system 100 further comprises a T-handle member 300. During operation, the T-handle member 300 is rotated by the user by rotating a slotted alignment member 310, wherein a T-handle piston head 305 adjoined to the slotted alignment member 310 contacts the hitch 110 and remove play between the hitch 110 and the hitch receiver 105. In some embodiments, the T-handle member 300 may be left in place within the slotted alignment member 310 permanently or removably attached to the slotted alignment member 310 as desired by the user. As shown in FIGS. 18A and 18B, the slotted alignment member 310 is threaded into a T-handle cylinder head 325. During assembly the slotted alignment member 310 is first threaded into the T-handle cylinder head 325, next a T-handle piston head 305 is adjoined to the slotted alignment member 310 by a T-handle fastener 315 inserted through the T-handle piston head 305 and into the slotted alignment member 310 from within the interior of the hitch receiver 105.

As described above, the hitch receiver alignment system 100 in some embodiments is used alongside reduction sleeves 330. In some embodiments, a fourth opening 335 protrudes through at least one reduction sleeve 330 allowing a member to contact the hitch 110 for alignment. The fourth opening 335 also aids in controlling undesired linear movement of the reduction sleeves 330 within the hitch receiver 105.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 0%, 5%, or 10%, including increments therein.

Unless otherwise defined, all technical terms used herein have the same meaning as commonly understood by one of ordinary skill in the art to which this disclosure belongs.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A hitch receiver alignment system for aligning a hitch within a hitch receiver, the hitch receiver alignment system comprising:
   a first opening extending through and arranged upon an external surface of the hitch receiver;
   a piston having a proximal end and a distal end, wherein the first opening is adapted to receive the proximal end of the piston;
   a cylinder having a cylinder front surface and a cylinder rear surface; wherein the cylinder rear surface is adjoined to the hitch receiver;
   a second opening extending into the cylinder rear surface and adapted to receive the distal end of the piston;
   a third opening extending through the cylinder adapted to receive an alignment member; and
   wherein the alignment member may be adjusted by a user to contact the distal end of the piston.

2. The hitch receiver alignment system of claim 1, wherein the distal end of the piston is greater in diameter than the proximal end of the piston.

3. The hitch receiver alignment system of claim 1, wherein the hitch receiver alignment system further comprises:
   a first plurality of holes arranged upon the cylinder front surface, each hole of the first plurality of holes adapted to receive a fastener.

4. The hitch receiver alignment system of claim 1, wherein the hitch receiver alignment system further comprises:
   at least one reduction sleeve within the hitch receiver.

5. The hitch receiver alignment system of claim 4, wherein the hitch receiver alignment system further comprises:
   a fourth opening extending through the at least one reduction sleeve.

6. The hitch receiver alignment system of claim 1, wherein the hitch receiver alignment system further comprises:
   an internal volume within the second opening between the proximal end of the piston and the cylinder.

7. The hitch receiver alignment system of claim 6, wherein the internal volume is pressurized by one member of a pressure material set consisting of: an oil, a gas, a fluid, and a volume of pressurized air.

8. The hitch receiver alignment system of claim 6, wherein the internal volume is accessible by at least one port extending through the cylinder.

9. The hitch receiver alignment system of claim 1, wherein the piston is adjoined to the alignment member.

10. The hitch receiver alignment system of claim 1, wherein the alignment member comprises at last one fastener.

11. The hitch receiver alignment system of claim 6, wherein the hitch receiver alignment system further comprises:
    at least one member of a valve set in fluid connection with the internal volume.

12. A hitch receiver alignment system for aligning a hitch within a hitch receiver, the hitch receiver alignment system comprising:
    a first opening extending through and arranged upon an external surface of the hitch receiver;
    an alignment member having a nested piston, a proximal end and a distal end, wherein the nested piston is free to rotate within the alignment member;
    a base member having a base member front surface and a base member rear surface;
    wherein the base member rear surface is adjoined to the hitch receiver;
    a second opening extending though the base member and adapted to receive the alignment member; and
    wherein a first mode of operation the distal end of the alignment member is manually engaged by a user to contact the hitch.

13. The hitch receiver alignment system of claim 12, wherein the alignment member further comprises:
    a receiving port extending into the alignment member and the nested piston;
    a set screw threadably engaged with the receiving port; and
    wherein the set screw aids to retain the nested piston within the alignment member.

14. A hitch receiver alignment system for aligning a hitch within a hitch receiver, the hitch receiver alignment system comprising:
    a first opening extending through and arranged upon an external surface of the hitch receiver;
    a piston having a proximal end and a distal end, wherein the first opening is adapted to receive the proximal end of the piston;
    a cylinder having a cylinder front surface and a cylinder rear surface; wherein the cylinder rear surface is adjoined to the hitch receiver;
    a second opening extending through the cylinder and adapted to receive the distal end of the piston;
    a cylinder head adjoined to the cylinder and having a cylinder head front surface and a cylinder head rear surface;
    a third opening, wherein the third opening extends through the cylinder head and is adapted to receive an alignment member; and
    wherein the alignment member may be adjusted by a user to contact the distal end of the piston.

15. The hitch receiver alignment system of claim 14, further comprising:
    a protrusion extension extending from the cylinder head rear surface and adapted to fit within the second opening of the cylinder.

16. The hitch receiver alignment system of claim 14, wherein the hitch receiver alignment system further comprises:
    a second plurality of holes arranged upon the cylinder head front surface, each hole of the second plurality of holes adapted to receive a fastener adjoining the cylinder head to the cylinder.

17. The hitch receiver alignment system of claim 14, wherein the hitch receiver alignment system further comprises:
    an internal volume within the second opening between the proximal end of the piston, the cylinder and the cylinder head.

18. The hitch receiver alignment system of claim 17, wherein the internal volume is pressurized by one member of a pressure material set consisting of: an oil, a gas, a fluid, and a volume of pressurized air.

19. The hitch receiver alignment system of claim 17, wherein the internal volume is accessible by at least one port extending through the cylinder and/or cylinder head.

20. The hitch receiver alignment system of claim 14, wherein the piston is adjoined to the alignment member.

21. The hitch receiver alignment system of claim 14, wherein the alignment member comprises at last one fastener.

22. The hitch receiver alignment system of claim 17, wherein the hitch receiver alignment system further comprises:
   at least one member of a valve set in fluid connection with the internal volume.

23. The hitch receiver alignment system of claim 14, wherein the hitch receiver alignment system further comprises:
   at least one reduction sleeve within the hitch receiver.

24. The hitch receiver alignment system of claim 23, wherein the hitch receiver alignment system further comprises:
   a fourth opening extending through the at least one reduction sleeve.

25. The receiver alignment system of claim 1, further comprising:
   an electronic control system, wherein the electronic control system alters movement of the piston.

26. The hitch receiver alignment system of claim 14, further comprising:
   an electronic control system, wherein the electronic control system alters movement of the piston.

27. The itch receiver alignment system of claim 1, further comprising:
   a protrusion extension extending from rear surface of the cylinder and adapted to fit within the first opening.

* * * * *